W. H. JAEGER.
PISTON RING FOR INTERNAL COMBUSTION ENGINES.
APPLICATION FILED APR. 14, 1917.

1,263,897.

Patented Apr. 23, 1918.

Inventor
WILLIAM H. JAEGER

By Watson E. Coleman
Attorney

UNITED STATES PATENT OFFICE.

WILLIAM H. JAEGER, OF TRENTON, NEW JERSEY.

PISTON-RING FOR INTERNAL-COMBUSTION ENGINES.

1,263,897.　　　　　　Specification of Letters Patent.　　Patented Apr. 23, 1918.

Application filed April 14, 1917. Serial No. 162,165.

*To all whom it may concern:*

Be it known that I, WILLIAM H. JAEGER, a citizen of the United States, residing at Trenton, in the county of Mercer and State of New Jersey, have invented certain new and useful Improvements in Piston-Rings for Internal-Combustion Engines, of which the following is a specification, reference being had to the accompanying drawings.

This invention relates to pistons, and particularly to the piston rings of pistons used in internal combustion engines.

One of the objects of this invention is to so construct or arrange the piston rings in the piston of an internal combustion engine that the lubricating oil will be prevented from passing beyond the piston rings at the head of the piston and thus be prevented from passing into the firing chamber of the engine. The passage of lubricating oil into the firing chamber of an internal combustion engine is one of the main causes for the deposit of carbon on the cylinder walls. Lubricating oil should be freely applied to the skirt of the piston, but should not pass beyond the head of the piston.

A further object of the invention is to so construct the piston rings and the piston ring grooves that the piston rings are leak-proof and cannot "slap," the prevention of the "slapping" of the piston rings reducing the wear on the piston rings.

A further object of the invention is to so form the piston rings and so arrange them on the piston that the slots or splits of the piston rings cannot move into register with each other and in this connection to provide a construction which will do away with the usual dowel pins which are used to prevent the rotation of the piston rings around the axis of the piston.

A further object of the invention is to so arrange the piston rings that the lubricating oil will be directed to the wrist pins of the piston.

And still another object is to provide piston rings so constructed and arranged that they can be kept under tension and are, therefore, leak-proof.

Other objects will appear in the course of the following description.

My invention is illustrated in the accompanying drawings, in which:—

Referring to these drawings, 10 designates a piston of an internal combustion engine, the piston being illustrated as a trunk piston, provided with the oppositely disposed inwardly projecting annular hubs 11 for the reception of the usual wrist pin. Preferably the skirt of the piston is provided with a plurality of circumferential grooves 12, the bottoms of the grooves being beveled downward and outward to the face of the skirt and being formed at a plurality of points with perforations 13 leading into the interior of the piston, these perforations permitting the oil in the cylinder wall to pass inward into the interior of the piston and so down into the crank case. Just above the bearings for the wrist pin, the outer surface of the piston is formed with downwardly extending grooves or recesses 14 open at their lower ends upon the upper surface of the wrist pin.

Figure 3:
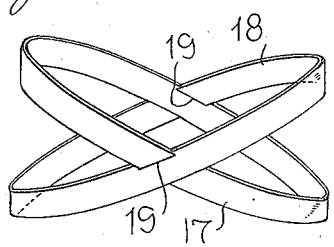
Fig. 3 is a perspective view of the two piston rings.

The head of the piston is formed with two piston ring grooves, designated respectively 15 and 16. Each of these grooves is disposed in a plane inclined to the plane of the ordinary piston ring grooves. In other words, each of these grooves is inclined to a plane parallel to the head of the piston and each groove is reversely inclined with relation to the other grooves, so that the grooves intersect at opposite points on the piston. Disposed in these grooves are the piston rings 17 and 18. Each of these rings is split at one point, the split extending diagonally to the plane of the piston ring. Directly opposite the split in each ring, each ring is formed with a recess 19, which receives one end of the other piston ring, the other end of this last named piston ring bearing against the edge face of the first named ring. This arrangement of the piston rings is clear from Fig. 3.

In the practical use of my invention the piston rings are sprung into place in the piston ring grooves in the usual manner, with the ends of each piston ring abutting against the side edge faces of the other piston ring and, as before stated, each ring is formed with a recess 19 to receive one end of the other piston ring. This, it will be seen, will absolutely prevent any rotation of the piston rings around the piston and this construction also has been found in practice to prevent any "slapping" of the piston rings, that is, any reciprocation of the piston rings in their grooves. Upon the out stroke of the piston, the piston rings scavenge the oil from the inner face of the cylinder and the inclined underfaces of the two piston rings guide the oil or direct it to the recesses or grooves 14 from which it drops down onto the wrist pin, keeping this wrist pin well oiled. It will be seen that the construction provides for two piston rings at all points of the piston, except immediately above the wrist pins, where the piston rings intersect. These piston rings have been found in practice to prevent the passage of lubricating oil into the firing chamber, and the consequent carbonizing of this oil therein and thus prevent the motor from smoking and greatly decrease the deposit of carbon on the cylinder walls.

Figure 1:
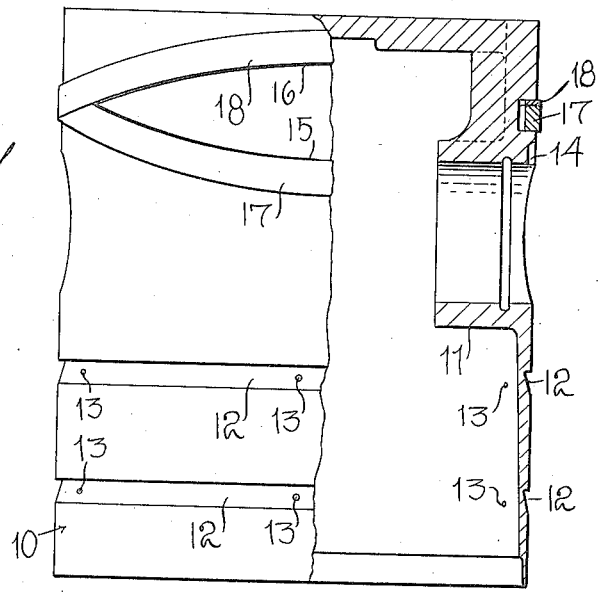
Figure 1 is a side view of a piston constructed in accordance with my invention, the wall of the piston being partly broken away and in section.
Figure 2:
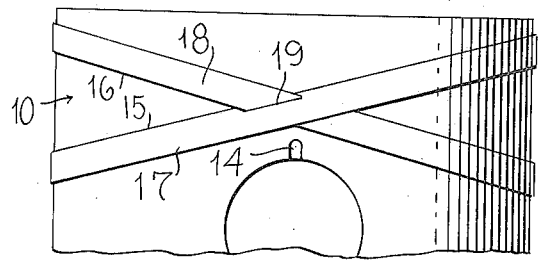
Fig. 2 is an elevation of the construction shown in Fig. 1, but viewed from a point at right angles to the view point of Fig. 1.

As previously stated, the piston rings arranged according to my invention will prevent "flopping" of the piston. All pistons are smaller than the bore of the cylinder to allow for expansion and, as a consequence, piston rings project beyond the surface of the piston and expand against the cylinder wall. Hence the piston can move laterally and on moving laterally, one side of the piston rings will be forced inward, while the other side will be relatively forced outward from the piston ring groove. The piston with ordinary piston rings will move laterally, due to the angular position of the connecting rod at different periods of the stroke. This causes wear on the piston ring grooves and the piston rings and further causes wear on the walls of the cylinder and scoring thereof and eventually this wear causes great loss of power. All motor parts will wear longer where there is no leakage or compression past the piston rings and, furthermore, if a low grade of gasolene be used, this gasolene passes by the rings and gets into the crank case and mixes with the lubricating oil, thus weakening the quality of the oil and causing further wear, the greater oil consumption and the smoking of the motors. This I have found in practice is obviated by the construction which I have described, for the reason that the lateral movement of the piston, due to the angularity of the connecting rod, will be resisted uniformly by the angular position of the piston rings, as indicated by the arrows in Fig. 2. All other piston rings known to me wear in diameter and the gaps get wider, which causes leakage of compression. In my piston ring construction, while the piston rings will decrease in diameter, due to wear, yet there will be no leakage, due to the interlocking of one ring with the other. Furthermore, by this arrangement, the piston rings will not move relative to each other, as one ring holds the other. I have found in actual practice that the motor will throttle down better with my piston rings, than it will with ordinary forms of piston rings, this being due to even compression on all of the cylinders. The motor will run more evenly and will respond to the throttle more quickly and will use less oil and gasolene. Furthermore, the wrist pins will be more perfectly lubricated. There is less vibration or knocking where my rings are used, the piston will not wear unevenly, and there are no dowel pins which are liable to fall out. Because of the relatively large size of these piston rings, any desired tension can be secured in them. In all other leak-proof piston rings known to me, the rings have been so delicate as to lack the proper tension.

While the arrangement of piston rings which I have above described and which is illustrated in the drawings is particularly applicable to internal combustion engines, for the reasons stated, yet I wish it understood that I do not desire to be limited to this use, as the piston rings may also be used in air compressors, steam engines, and in any other form of mechanism where pistons and piston rings are used.

Having thus described my invention, what I claim is:—

1. A piston for internal combustion engines having two piston ring grooves, each disposed at an inclination to the axis of the piston and crossing each other at two opposite points, and piston rings disposed in said grooves.

2. A piston having two piston ring grooves, each disposed at an inclination to the axis of the piston and crossing each other at opposite points, and split piston rings disposed in said grooves, the ends of each piston ring abutting against the middle portion of the other piston ring.

3. A piston for internal combustion engines having two piston ring grooves, each disposed at an inclination to the axis of the piston and crossing each other at opposite points, and split piston rings disposed in said grooves, each ring at its middle having a recess upon one edge face to receive one extremity of the other ring, the other extremity of the last named ring bearing against the edge face of the intersecting ring opposite said groove.

4. A piston for internal combustion engines having wrist pin bearings, and piston rings disposed at an angle to each other above said bearings and extending outward and toward the outer end of the piston on each side of said bearings to thereby direct lubricating oil toward the bearings.

5. A piston for internal combustion engines having oppositely disposed wrist pin bearings, the piston being formed with two piston ring grooves, each disposed at an inclination to the axis of the piston, said piston ring grooves crossing each other at opposite points above the wrist pin bearings, and split piston rings disposed in said grooves.

6. A piston for internal combustion engines having wrist pin bearings and having a recess formed in the outer face of the piston above each bearing and opening upon said bearing and also formed above the recess with a pair of piston ring grooves, the grooves extending at an inclination to each other and intersecting at opposite points above the said grooves, and split piston rings disposed in said grooves and crossing each other.

In testimony whereof I hereunto affix my signature in the presence of two witnesses.

WILLIAM H. JAEGER.

Witnesses:
 ROSE JAEGER,
 W. C. ROCKHILL HART.